(12) United States Patent
Kurian et al.

(10) Patent No.: US 9,825,963 B2
(45) Date of Patent: *Nov. 21, 2017

(54) ENCAPSULATING COMMANDS WITHIN A CONTROL WRAPPER FOR MULTIPLE LEVEL REVIEW

(71) Applicant: Bank of America Corporation, Charlotte, NC (US)

(72) Inventors: Manu Kurian, Dallas, TX (US); Sorin N. Cismas, Southlake, TX (US)

(73) Assignee: Bank of America Corporation, Charlotte, NC (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/816,236

(22) Filed: Aug. 3, 2015

(65) Prior Publication Data

US 2017/0041322 A1    Feb. 9, 2017

(51) Int. Cl.
*H04L 29/08*    (2006.01)
*H04L 29/06*    (2006.01)

(52) U.S. Cl.
CPC ............ *H04L 63/102* (2013.01); *H04L 63/12* (2013.01); *H04L 67/10* (2013.01)

(58) Field of Classification Search
USPC .......................................................... 726/4
See application file for complete search history.

(56) References Cited

U.S. PATENT DOCUMENTS 7,363,363 B2 *   4/2008   Dal Canto .......... H04L 63/0272
                                                  379/201.04
8,296,822 B2 *  10/2012   Becker .................. G06F 21/305
                                                       709/229
9,021,558 B2 *   4/2015   Zlatarev .................. G06F 21/31
                                                          726/1

(Continued)

OTHER PUBLICATIONS

Dec. 16, 2016—(US) Non-Final Office Action—U.S. Appl. No. 14/816,187.

(Continued)

*Primary Examiner* — Amare F Tabor
(74) *Attorney, Agent, or Firm* — Banner & Witcoff, Ltd.; Michael A. Springs

(57) ABSTRACT

Methods, systems, and computer-readable media for reviewing inputted commands and preventing the execution of accidentally or maliciously entered adverse commands are disclosed. These commands may be operating system commands, resource commands, device commands, application commands, and so on. Some aspects of the disclosure provide ways to approve commands prior to their execution, or validate commands subsequent to their execution. In some aspects, execution of the command may be undone or reversed if the command is not successfully validated. Commands may be encapsulated in a control wrapper to identify commands subject to pre-execution approval process and/or the post-execution validation, and criteria regarding the commands or the user entering the commands may be used to determine whether pre-execution approval (Continued)

and/or post-execution validation is required. Indications of approval or denial of a command may be transmitted to other computing devices to reduce or eliminate malicious or accidental activity.

20 Claims, 11 Drawing Sheets

(56) References Cited

U.S. PATENT DOCUMENTS

| | | | |
|---|---|---|---|
| 2002/0147926 A1* | 10/2002 | Pecen | H04W 12/06 726/7 |
| 2004/0139202 A1* | 7/2004 | Talwar | H04L 29/06 709/229 |
| 2006/0106917 A1* | 5/2006 | Lambourn | G06F 21/6218 709/217 |
| 2009/0113514 A1 | 4/2009 | Hu | |
| 2010/0281173 A1* | 11/2010 | Vutukuri | G06F 21/305 709/228 |
| 2013/0081109 A1* | 3/2013 | Venkataraman | G06F 17/3056 726/4 |
| 2014/0130119 A1 | 5/2014 | Goldschlag et al. | |
| 2014/0366099 A1* | 12/2014 | Le Huerou | H04L 63/08 726/4 |
| 2016/0006743 A1* | 1/2016 | Liu | H04L 9/32 726/4 |
| 2016/0072821 A1* | 3/2016 | Wu | H04L 69/16 726/4 |
| 2016/0104002 A1* | 4/2016 | Schneider | G06F 17/30563 726/1 |
| 2016/0182525 A1* | 6/2016 | Zhu | H04L 63/083 726/1 |

OTHER PUBLICATIONS

Apr. 12, 2017—(US) Notice of Allowance—U.S. Appl. No. 14/816,187.

* cited by examiner

600

| Authorized User | you@domain.com |

601 — Provide Instruction

You have been assigned the following task for co-entry:

| | |
|---|---|
| 602 — Case No: | XXXX-ZZZZZ |
| 603 — Issue | Correction of duplicate withdrawals on YYYY-DD-MM |
| 604 — Your Command: | "MODIFY new_balance = (old_balance + 100.00) FROM FILE user.csv ON prodDB" |

605 — Submit

| Authorized User 1 | you@domain.com |
| Authorized User 2 | first.last@domain.com |

Provide Instruction

The co-entry commands do not match:

| | |
|---|---|
| 612 — First.Last Command: | "MODIFY new_balance = (old_balance + 100.00) FROM FILE user2.csv ON prodDB" |
| 613 — Your Command: | "MODIFY new_balance = (old_balance + 100.00) FROM FILE user.csv ON prodDB" |

614 — | My Command | 615 — First.Last Command | 616 — Request Info |

| Authorized User | first.last@domain.com |

701 — Task & Keycode

You have been assigned the following task:

| Case No: | XXXX-ZZZZZ |
| Issue | Correction of duplicate withdrawals on YYYY-DD-MM |
| 702 Command Entry: | "MODIFY new_balance = (old_balance + 100.00) FROM FILE user.csv ON prodDB" |
| 703 First.Last Keycode: | DCIRJCNA |

Submit

| Authorized User | first2.last2@domain.com |

711 — Authorize with Keycode

Please review the following task performed by first.last:

| Case No: | XXXX-ZZZZZ |
| Issue | Correction of duplicate withdrawals on YYYY-DD-MM |
| 712 Command Entered: | "MODIFY new_balance = (old_balance + 100.00) FROM FILE user.csv ON prodDB" |
| 713 First2.Last2 Keycode: | ABDEGCFJ |

Deny 714 | Submit

800

| | User | Role | Pre-Approval Code | Pre-Approved Commands | Forbidden Commands |
|---|---|---|---|---|---|
| 801 | User | Role | Pre-Approval Code | Pre-Approved Commands | Forbidden Commands |
| 802 | User1 | Developer | 1 (dev DB only) | read, write, copy, flag | delete |
| 803 | User2 | Support Admin | 2 (prod DB only) | read, flag | delete |
| 804 | User3 | Governance User | 0 (no DB access) | <none> | <all> |
| 805 | User4 | Architect | 3 (all DB access) | read, write, modify | <none> |
| 806 | User5 | Administrator | 3 (all DB access) | read, write, copy, flag, modify | delete |
| 807 | User6 | Administrator | 1 (dev DB only) | <none> | <none> |

FIG. 8A

| | User | Command | Reviewer(s) | Next Reviewer |
|---|---|---|---|---|
| 810 | User | Command | Reviewer(s) | Next Reviewer |
| 811 | User1 | write[prod DB] | User5 AND User3 | |
| 812 | User2 | modify[prod DB] | User 3 OR User 4 | User 6 |
| 813 | User6 | Any | User 5 | |
| 814 | Any | modify[prod DB] | User 3 | |

FIG. 8B

ENCAPSULATING COMMANDS WITHIN A CONTROL WRAPPER FOR MULTIPLE LEVEL REVIEW

CROSS REFERENCE TO RELATED APPLICATIONS

This application is related to a U.S. Non-Provisional Application entitled "ENCAPSULATING COMMANDS WITHIN A CONTROL WRAPPER FOR SPLIT ENTRY OR APPROVAL," filed concurrently herewith and identified by Ser. No. 14/816,187, the contents of which are hereby incorporated by reference in their entireties for all purposes.

FIELD

Aspects of the disclosure relate to computer hardware and software. In particular, one or more aspects of the disclosure generally relate to computer hardware and software for validating and approving commands, including encapsulating commands within a control wrapper.

BACKGROUND

Users in a computing system may be provided with various permissions or rights. For example, a common access mechanism is to provide a user with credentials, such as a user ID/name and a password. The user may present the user identification and/or password to receive access to a resource, or permission to read, write, or execute computer resources, such as computer files or databases. Some users, particularly users employed by an institution (such as a financial institution) may be provided with administrator or super-user access rights. These administrator or super-user access rights may provide a user with greater or more expansive abilities to perform read, write, delete, modify, and execute operations than a non-administrator user.

Users may be grouped together and assigned permissions based on their role within an organization or within the institution. For example, programmers may be given one set of file permissions (e.g., able to read from/write to development repositories and read-only from production repositories) which may be different from, either partially or totally, from a set of file permissions given to release engineers (e.g., able to read-only from development repositories and read-write to production repositories). Generally, access to a resource or operation of a computing device or system is viewed as a binary question: either the user has the appropriate access or permission set to access the resource or operate the computing device, or the user does not have the appropriate access or permission set, in which case the operation will be denied.

SUMMARY

Given that the very nature of their jobs may require them to have a large array of permissions, rights, access, and so on, system administrators or other user(s) having elevated permissions may be able to issue a large number of commands or instructions. In some situations, these commands may be executed without additional levels of verifications. Such access may allow an ill-intentioned or accidental change to go into a confidential file (such as a payments file, accounts file, permissions file, user database, and so on) and allow that administrative user to, intentionally or inadvertently, add, delete or change records, which may result in a security breach or loss of data integrity.

Logging the administrative user's access to the resource, or modification thereof, might not ameliorate the problem. For example, a malicious administrative user may be able to modify the log or prevent the logging from happening. This may reduce the likelihood the intrusion will be detected. Further, in some computing systems, internal users might not be monitored to the same degree as external users; where the presentation of a command resulting in accidental effects may take a long time to uncover. Access may be recorded and notifications may be provided, but the execution of the commands might not be prevented especially if the person is supposed to have that access.

Given the importance of keeping computing systems operational and accuracy in transactions, it may be useful and important for an organization and its computer systems to improve its computing devices and systems to minimize malicious or accidental execution of computing commands, prevent malicious or accidental access of sensitive data, and so on.

Accordingly, one or more aspects of the present disclosure may provide methods that include a computing device receiving from a user associated with the computing device, one or more inputted commands. The user associated with the computing device may be authorized to execute one or more commands affecting a restricted resource. The computing device may determine that the inputted commands comprises a restricted command to access the restricted resource, and based on the determination of the restricted command, may determine that the user associated with a computing device requires an approval from another user to execute the restricted command. The computing device may queue the restricted command in a queue in response to the determining that the restricted command requires the approval. The computing device may communicate an indication of the restricted command to a network location associated with the other user and different from the computing device. The computing device may receive, from the network location, an indication of an approval status of the restricted command. The computing device may transmit one or more notifications to another device to update a record stored at the other device and associated with the restricted resource to include information indicating the approval status.

One or more aspects of the present disclosure may provide methods that include a computing device receiving, from a user associated with the computing device, one or more inputted commands. The one or more inputted commands may include a restricted command to access a restricted resource. The user associated with the computing device may be authorized to execute commands affecting the restricted resource. The computing device may determine that execution of the restricted command by the user associated with a computing device requires a validation from another user. The computing device may queue the one or more inputted commands for execution and may receive an indication that the one or more inputted commands have been executed. The computing device may transmit one or more notifications to another device to update a record stored at the other device and associated with the restricted command to include information indicating the restricted command has been executed by the user. The computing device may communicate an indication of the restricted command to a network location associated with the other user and different from the computing device. The computing device may receive from the network location an indication of a validation status of the command.

One or more aspects of the present disclosure may provide methods that include a computing device receiving, from a user associated with the computing device, one or more inputted commands. The user associated with the computing device may be authorized to execute one or more commands affecting a restricted resource. The computing device may determine that the one or more inputted commands includes a restricted command to access the restricted resource. Based on the determination of the restricted command, the computing device may determine that the user associated with a computing device requires an approval to execute the restricted command from a governance user. The computing device may queue the restricted command in a queue in response to the determining that the restricted command requires the approval and may communicate an indication of the restricted command to a first network location different from the computing device. The computing device may receive from the network location an indication of an approval of the restricted command. The computing device may transmit one or more notifications to another device to update a record stored at the other device and associated with the restricted resource to include information indicating the approval. The computing device may queue the one or more inputted commands for execution. The computing device may receive an indication that the one or more inputted commands have been executed, and may determine that execution of the restricted command by the user associated with a computing device may require a validation from a validation user. The computing device may communicate an indication of the restricted command to a second network location different from the computing device and different from the first network location. The computing device may receive from the second network location, an indication of a validation status of the command, and may transmit one or more notifications to another device to update a record stored at the other device and associated with the restricted resource to include information indicating the validation status.

BRIEF DESCRIPTION OF THE DRAWINGS

The present disclosure is illustrated by way of example and not limited in the accompanying figures in which like reference numerals indicate similar elements and in which:

FIGS. 6A-C depict graphical user interfaces illustrating co-entry of a command by multiple authorized users, in accordance with one or more example embodiments;

FIGS. 7A-B depict graphical user interfaces illustrating entry of a command and a validating keycode in accordance with one or more example embodiments;

FIGS. 8A-B depict illustrative properties of users and relationships between users in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
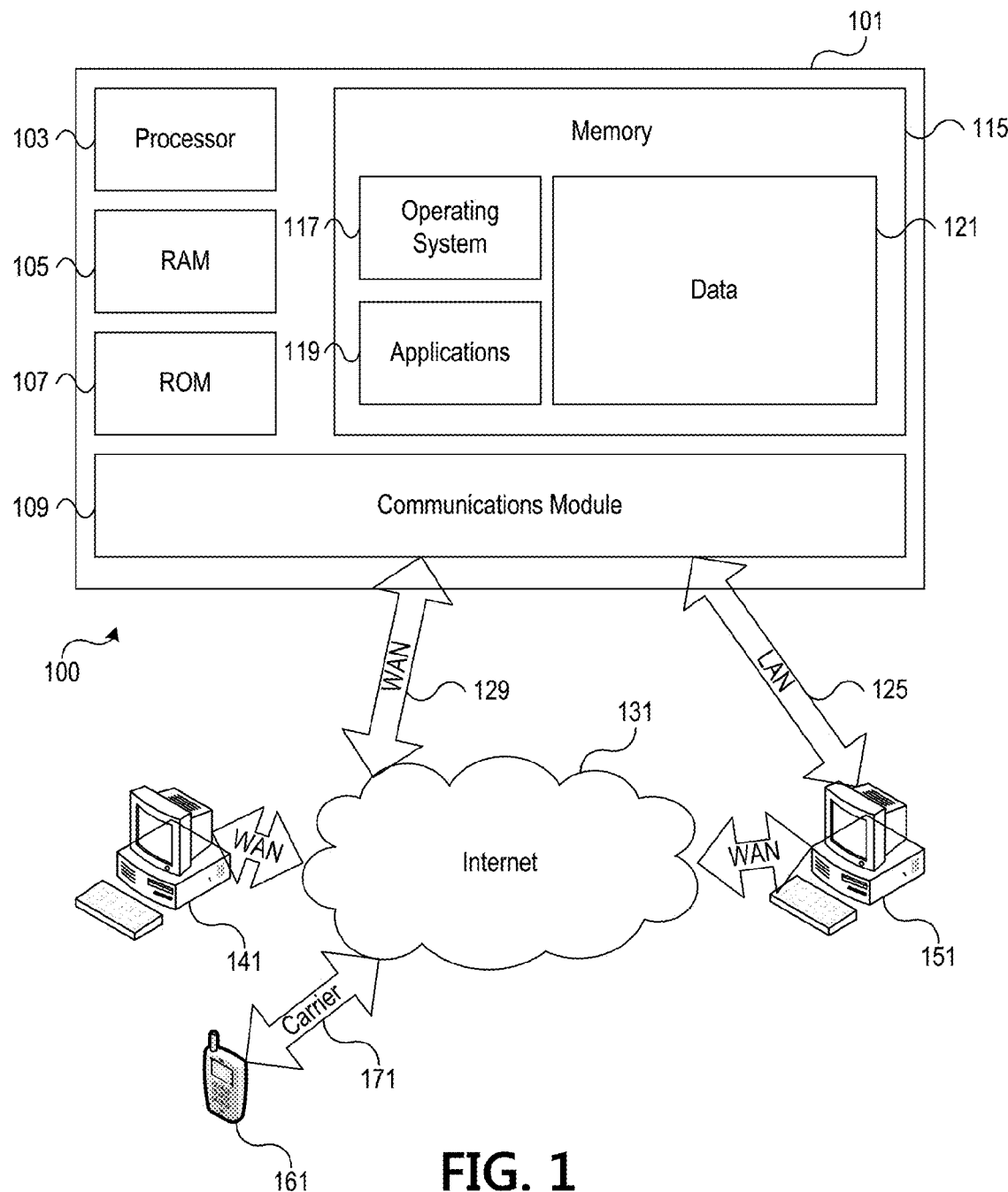
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Illustrative usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
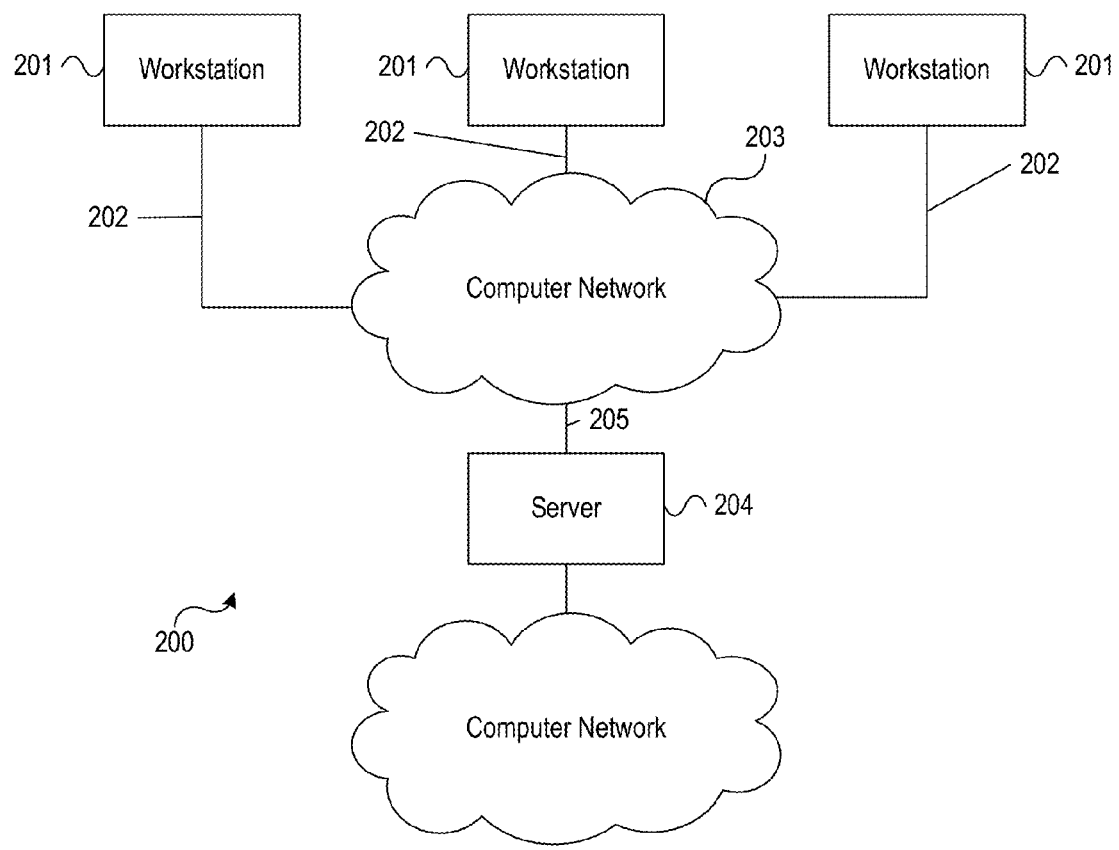
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
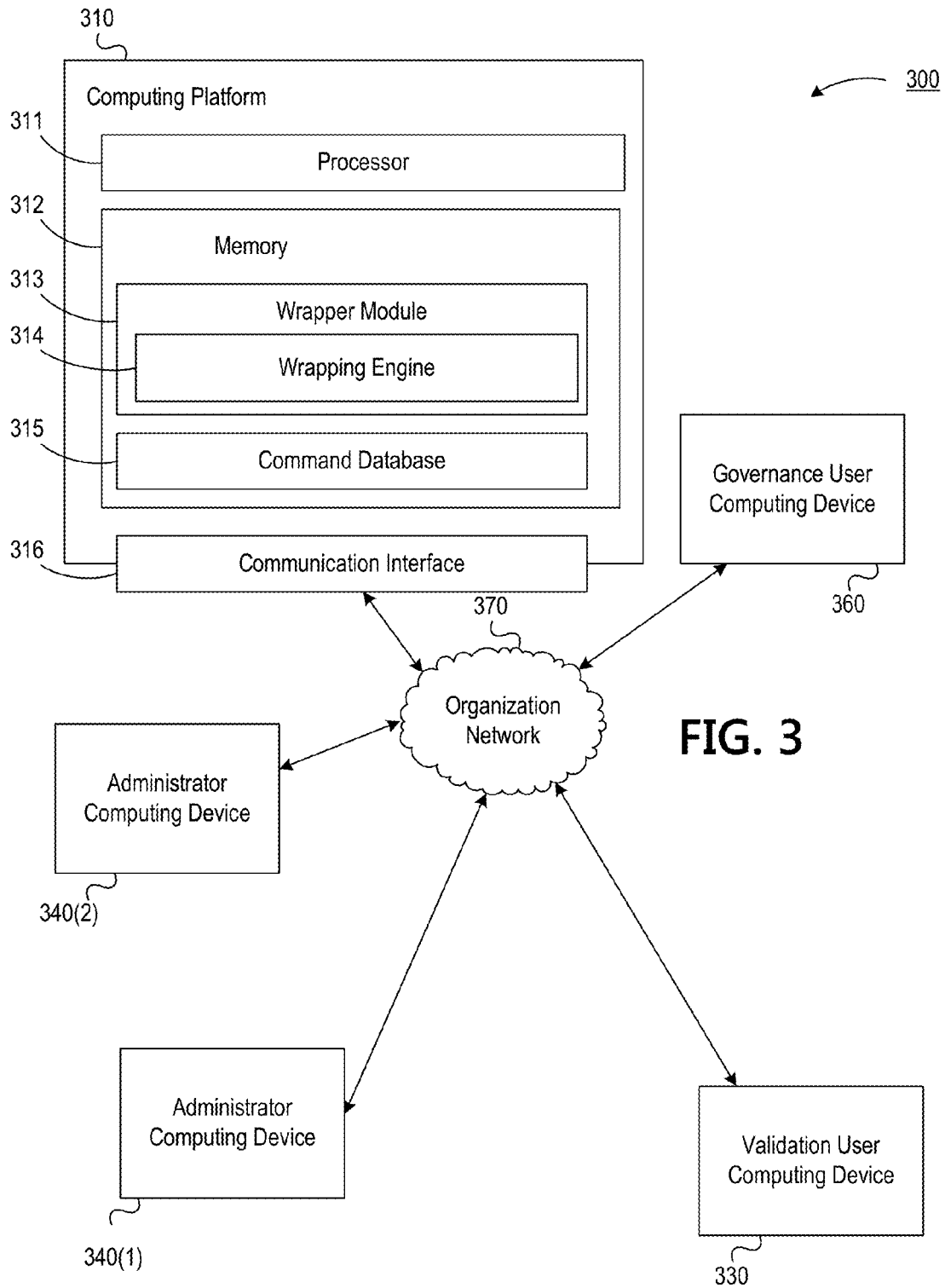
FIG. 3 depicts an illustrative computing environment for analyzing threats and transmitting and receiving information to customers, agents, analysts, or the like in accordance with one or more example embodiments.

FIG. 3 depicts an illustrative computing environment for authoring, issuing, executing, authorizing, and validating commands associated with one or more users of a computing system, in accordance with one or more example embodiments. Referring to FIG. 3, computing environment 300 may include one or more computing devices, including administrator computing devices 340(1) and 340(2), and one or more validation user computing devices 330, one or more governance user computing devices 360. The devices depicted in FIG. 3 may be present in any number in the computing environment 300.

Other devices and systems, including other computing devices associated with one or more customers, agents, customer service representatives (CSRs), retail locations, executives, and so on, may be present in the computing environment 300, but not depicted in FIG. 3. Additionally or alternatively, such non-depicted devices may overlap with one of the depicted devices or systems. For example, a customer computing device may be used by and/or configured to be used by a customer of an organization, such as a particular customer of a financial institution, and may be a mobile device or non-mobile device. In some aspects, a customer may have more than one customer computing device with which they interact with other computing devices and systems and components and subcomponents thereof. In some aspects, a customer computing device may be shared by one or more customers of the organization.

A CSR computing device may be another example of a computing device which may be present in computing environment 300 but not illustrated in FIG. 3. A CSR computing device may, e.g., be used by an agent of an organization, such as a customer-facing agent tasked with responding to customer requests regarding account status, information, inquiries, promotions, or the like. Such requests may be received at CSR computing device in any of a number of formats, including video messaging, text messaging, two-way messaging (e.g. instant or chat messaging), voice (e.g. by way of a telephone, VoIP, or other like voice-carrying formats), e-mail, or the like. Such customer requests or messages may be received at the CSR computing device from customer computing device via a public network individually or in conjunction with an organization network. In some aspects, the CSR computing device also may include a terminal device (which may, e.g., be used by a local agent of an organization in a retail location of the organization, such as by a bank teller of a financial institution who is located in a banking center of the financial institution).

Administrator computing devices 340(1) and 340(2) may each be used by one or more administrators or other authorized users (e.g., super-users) associated with an organization or institution. These computing devices may be specially programmed to enable administrators or authorized users to read, write, execute, access, and modify resources, or perform other similar operations. Each of computing devices 340(1) and 340(2) may include peripherals, accessories, components, sub-components, hardware, software, firmware, and so on which may enable an administrator or user operating the computing devices 340(1) and 340(2) to receive and/or transmit a variety of data. These accessories or components may include, for example, components such as a video camera and/or microphone, which may be used in combination to facilitate messaging such as video messaging, text-messaging, voice messaging, two-way messaging, and so on. Computing devices 340(1) and 340(2) may be configured to receive inputs from an authorized user and/or administrator via a variety of input-enabling components (e.g., video camera, keyboard, mouse, microphone, touchscreen, and so on). These inputs may include instantiating an attempt to access a resource, commands to be executed by one or more resources and/or computing devices, or other input which may require approval. In some aspects, the user may be authorized via a permission, credential, token, password, or the like to access the resource. For example, a user may be provided with an administrator password which facilitates access to a resource. As another example, a user may be assigned a role of administrator. A computing device or component of a computing device present in the computing environment 300 may include a permissioning resource or service which may establish that users assigned the role of administrator may have access to a resource. As another example, a user may present a credential or token (e.g., biometric, authentication code, or the like) which may identify the user as an administrator or other authorized user.

Governance user computing device 360 may be used by a user of an organization tasked with reviewing and approving commands inputted by authorized users (e.g., users operating administrator computing devices 340(1) and/or 340(2)). Governance user computing devices may include peripherals, accessories, components, sub-components, hardware, software, firmware, and so on which may enable a governance user operating the governance user computing device 360 to receive and/or transmit a variety of data. These accessories or components may include, for example, components such as a video camera and/or microphone, which may be used in combination to facilitate messaging such as video messaging, text-messaging, voice messaging, two-way messaging, and so on. In some aspects, these accessories or components may facilitate a connection to request information from one or more users operating administrator computing devices 340(1) and/or 340(2). This connection may include a communication transmitted via organization network 370.

Governance user computing device 360 may be configured to receive inputs from an governance user via a variety of input-enabling components (e.g., video camera, keyboard, mouse, microphone, touchscreen, and so on). In some aspects, a governance user may be also an administrator, and as such, governance user computing device 360 may include any or all of the above-discussed components of administrator computing device 340(1) and/or 340(2).

Computing environment 300 also may include a validation user computing device 330. As with governance user computing device 360, validation user computing device 330 may be used by a user of an organization tasked with reviewing and approving commands inputted by authorized users (e.g., users operating administrator computing devices 340(1) and/or 340(2)).

Figure 4A:
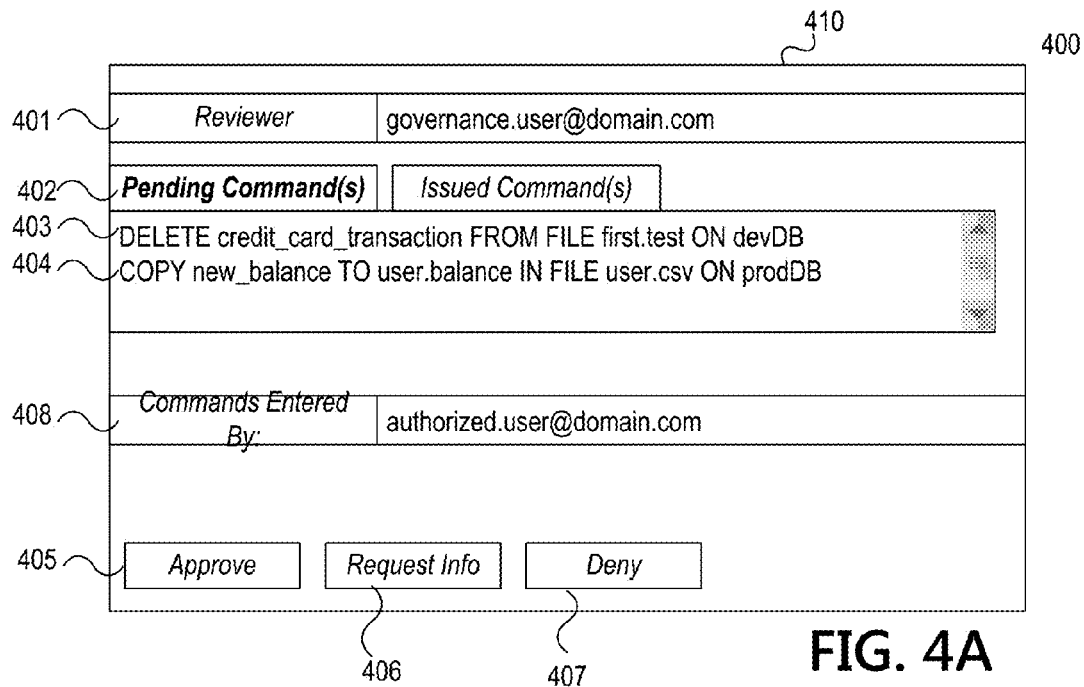
FIGS. 4A and 4B depict an illustrative graphical user interface in which commands may be approved prior to their execution and/or validated after their execution, according to one or more example embodiments.
Figure 4B:
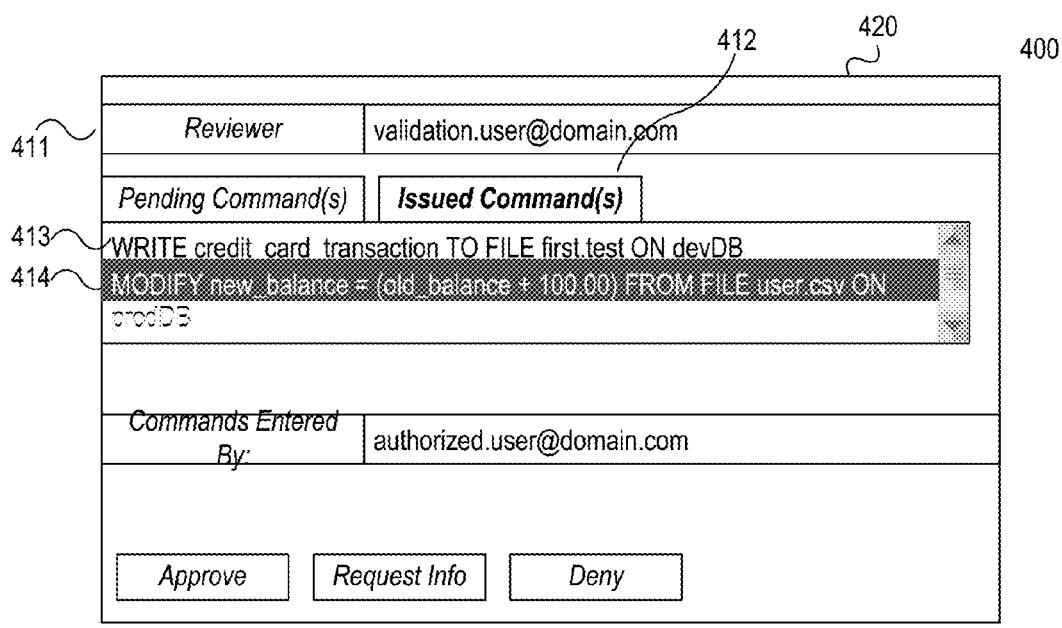

In some aspects, a governance user may be tasked with approving commands prior to their execution, and a validation user may be tasked with approving commands after their execution. For example, an administrator may input a command or group of commands. With reference to FIG. 4A and FIG. 4B, which will be discussed further below, an administrative user may input command 403, command 404, command 413, and command 414. As depicted in FIG. 4A, command 403 and command 404 may be, subsequent to their input by the administrative user, held as pending commands for approval by a governance user (indicated by reviewer name 401 and pending commands tab 402). As depicted in FIG. 4B, command 413 and 414 may be issued commands, the result of which may need to be validated by a validation user (indicated by reviewer name 411 and issued commands tab 412).

Returning to FIG. 3, a validation user may be also an administrator, and as such, validation user computing device 330 may include any or all of the above-discussed components of administrator computing device 340(1) and/or 340 (2). Additionally, the roles of validation user and governance user may overlap, and one or more devices may include the components of validation user computing device 330 and governance user computing device 360. Validation user computing devices may include peripherals, accessories, components, sub-components, hardware, software, firmware, and so on which may enable a governance user operating the validation user computing device 330 to receive and/or transmit a variety of data. These accessories or components may include, for example, components such as a video camera and/or microphone, which may be used in combination to facilitate messaging such as video messaging, text-messaging, voice messaging, two-way messaging, and so on. In some aspects, these accessories or components may facilitate a connection to request information from one or more users operating administrator computing devices 340(1) and/or 340(2). This connection may include a communication transmitted via organization network 370.

As noted above, and as illustrated in greater detail below, any and/or all of the computing devices and computing platforms of computing environment 300 may be special-purpose computing devices configured to perform specific functions.

Computing environment 300 also may include one or more computing platforms. For example, computing environment 300 may include a computing platform 310. The computing platform 310 may include one or more special-purpose or specially-programmed computing devices configured to perform one or more of the functions described herein. For example, the computing platform 310 may include one or more computers (e.g., laptop computers, desktop computers, servers, server blades, or the like). Computing platform 310 may include one or more processors 311, memory 312, and communication interface 316. A data bus may interconnect processor(s) 311, memory 312, and communication interface 316. Communication interface 316 may be a network interface configured to support communication between computing platform 310 and organization network 370 and/or one or more sub-networks thereof. Memory 312 may include one or more program modules having instructions that when executed by processor(s) 311 cause computing platform 310 to perform one or more functions described herein and/or one or more databases that may store and/or otherwise maintain information which may be used by such program modules and/or processor(s) 311.

For example, memory 312 may include a wrapper module 313, which may include instructions that when executed by processor(s) 311 cause computing platform 310 to perform one or more functions described herein, such as instructions for encapsulating one or more commands with a command wrapper. Execution of the command wrapper may, for example, queue the encapsulated command for approval by a governance user, co-entry by multiple administrative users, and/or validation after execution by a validation user. For instance, wrapper module 313 may include executable instructions for and/or otherwise provide a wrapping engine 314, which may be used in generating and/or applying one or more command wrappers to commands.

In addition, memory 312 may include a command database 315, which may store information identifying one or more generated or applied command wrappers, and/or commands which, when executed, require encapsulation with a command wrapper, and/or information associated with or identifying data retrieved based on one or more commands or encapsulated commands, as illustrated in greater detail below. Commands for which information may be stored in command database 315 may include, for example, various operating system commands, application commands, user interface commands, database commands, network commands, and so on.

Computing environment 300 also may include one or more networks, which may interconnect one or more of the computing devices and/or platforms. For example, computing platform 310, administrator computing devices 340(1) and 340(2), governance user computing device 360, and validation user computing device 330 may be interconnected via organization network 370. Organization network 370 may include one or more sub-networks (e.g., LANs, WANs, VPNs or the like). Organization network 370 may be associated with a particular organization (e.g., a corporation, financial institution, educational institution, governmental institution, or the like) and may interconnect one or more computing devices associated with the organization. For example, computing platform 310, administrator computing devices 340(1) and 340(2), governance user computing device 360, and validation user computing device 330 may be associated with an organization (e.g., a financial institution), and organization network 370 may be associated with and/or operated by the organization.

A public network may be present in computing environment 300, although not illustrated in FIG. 3. A public network may connect an organization network (e.g., organization network 370) and/or one or more computing devices connected thereto (e.g., computing platform 310, administrator computing devices 340(1) and 340(2), governance user computing device 360, and validation user computing device 330) with one or more networks and/or computing devices that are not associated with the organization. For example, other computing devices (e.g., credentialing services, third-party authenticator services, or the like) may be owned and/or operated by one or more entities different from the organization that operates organization network 370, rather than being owned and/or operated by the organization itself or an employee or affiliate of the organization), and the public network may include one or more networks (e.g., the internet) that connect those computing devices not operated by the organization to organization network 370 and/or one or more computing devices connected thereto (e.g., computing platform 310, administrator computing devices 340(1) and 340(2), governance user computing device 360, and validation user computing device 330).

FIG. 4A-4B illustrate an illustrative user interface for approving commands prior to execution and validating commands subsequent to execution, in accordance with one or more aspects of the present disclosure. As discussed above, an organization may employ one or more users who may be provided with access to restricted resources. These restricted resources may include databases or other data-storing devices or platforms, which may store financial information, user information, transaction information, account information, medical record information, or other sensitive data. Additionally or alternatively, these restricted resources may include systems or devices which may operate in a production environment, where sensitive data is received and processed. Additionally or alternatively, these restricted resources may include systems or devices which may operate in a non-production environment, such as a development environment, testing environment, staging environment, quality assurance environment, and so on. For example, a non-production environment may be provided so that authorized users may prepare modules, code, software, hardware, and so on for eventual deployment to a production environment.

In some aspects, the development environment might not include sensitive data, but access may be restricted to prevent accidental or malicious deletion of modules in-development. Access may also be restricted to prevent insertion of accidental code (e.g., a "software bug") or malicious data or instructions which, if propagated to the production environment, may result in a security breach. In some aspects, a non-production environment may be used to diagnose problems with sensitive data, and as such, access to the non-production environment may be restricted to comply with internal or external security rules, regulations, laws, statutes, and so on. In some aspects, the users provided access to these restricted resources may be administrators, super-users, authorized users, and so on.

In some aspects, to prevent or eliminate accidental or ill-intentioned usage of the restricted resources by the users granted access (e.g., the authorized users), an organization may employ one or more users tasked with pre-execution approval, co-entry, or post-entry validation of commands entered by authorized users. In some aspects, a governance user may be tasked with approving commands prior to their execution, and a validation user may be tasked with approving commands after their execution. For example, an authorized user may input a command or group of commands and queue them for execution on a computing device and/or platform. With reference to FIG. 4A, a user interface 400 may be instantiated on a computing device associated with a governance user (e.g., governance user computing device 360). In some aspects, a governance user may be notified to access user interface 400 via one or more notification mechanisms. For example, the governance user may be sent an e-mail indicating a command has been queued for pre-execution approval. As another example, a mobile device (e.g., smartphone, tablet device, or so on) associated with the governance user may receive a signal indicating that a notification should be presented to the governance user informing them of the queuing of a command for pre-execution approval.

As illustrated in FIG. 4A, screen 410 may contain an indication of an authorized user 408 who has entered one or more commands 403 and 404 for execution. A computing device and/or computing platform (e.g. administrator computing device 340(1), administrator computing device 340(2), governance user computing device 360, computing platform 310) may detect the entry of commands 403 and 404.

As an example of such detection by one or more computing devices and/or computing platforms, consider the "DELETE credit card transaction FROM FILE first.test ON devDB" command 403. The "DELETE" command (e.g., the portion of a computing program or package providing the computer instructions and/or operative functionality to delete) may be encapsulated with a control wrapper by, for example, wrapper module 313 and/or wrapping engine 314. As such, the computing device and/or computing platforms executing the entered commands may, upon encountering the encapsulated DELETE command, queue the instruction (or a sequence of instructions including the DELETE command) for pre-execution approval by a governance user. The computing device and/or computing platform may determine that a sequence of commands may need to be held for execution prior to the execution of any command in the sequence. For example, the DELETE command may have been entered as part of an atomic transaction (e.g., an indivisible transaction) and other commands of the atomic transaction may also need to be held to prevent atomicity failures.

Within screen 410, a governance user may be presented with an approval input control 405, a request information input control 406, and a denial input control 407. In some aspects, input of a determination of the governance user may be via different input mechanisms, controls, or devices than the buttons illustrated in screen 410. For example, a governance user may provide as input the spoken words "approve," "request," and/or "deny" which may be received via a microphone and processed accordingly. The governance user may review one or more of the commands 403 and 404 and select the appropriate input. For example, the governance user may determine that the DELETE command 403 is approvable because it may result in a desired deletion of a test file on a development database. The governance user may select the command 403 and input an indication of approval by the governance user (e.g., select approval input control 405). Alternatively, the governance user may determine that the DELETE command 403 is not approvable because it may result in a non-desirous deletion of a test file on a development database (for example, because the file is associated with a user different from the authorized user who entered the command). The governance user may indicate denial of the command (e.g. select denial input control 406), and an appropriate indication may be returned to the computing device and/or computing platform executing the commands. An indication of the denial may also be transmitted to a computing device associated with the authorized user that originally input the command (e.g., the device where the commands were entered, another device, or the like). For example, the authorized user that input the DELETE command may receive an e-mail indicating that the command has been denied.

Additionally or alternatively, and with reference to FIG. 4B, a user interface 400 may be instantiated on a computing device associated with a validation user (e.g., validation user computing device 360). In some aspects, a validation user may be notified to access user interface 400 via one or more notification mechanisms. For example, the validation user may be sent an e-mail indicating a command has been queued for post-execution validation. As another example, a mobile device (e.g., smartphone, tablet device, or so on) associated with the validation user may receive a signal indicating that a notification should be presented to the validation user informing them of the queuing of a command for post-execution validation.

As illustrated in FIG. 4B, screen 410 may contain an indication of an authorized user 411 who has entered one or more commands 413 and 414, which may have already been executed. A computing device and/or computing platform (e.g. administrator computing device 340(1), administrator computing device 340(2), validation user computing device 330, computing platform 310) may detect the entry of commands 413 and 414.

As an example of such detection by one or more computing devices and/or computing platforms, consider the "WRITE credit card transaction TO FILE first.test ON devDB" command 413. The "WRITE" command (e.g., the portion of a computing program or package providing the computer instructions and/or operative functionality to write) may be encapsulated with a control wrapper by, for example, wrapper module 313 and/or wrapping engine 314. As such, the computing device and/or computing platforms executing the entered commands may, upon encountering the encapsulated WRITE command, queue the instruction (or a sequence of instructions including the WRITE command) for post-execution validation by a validation user. The computing device and/or computing platform may determine that a sequence of commands may need to be flagged as associated with the queued command in case the executed command is not approved. For example, the WRITE command may have been entered as part of an atomic transaction (e.g., an indivisible transaction) and other commands of the atomic transaction may need to be undone and/or rolled back to prevent atomicity failures.

Within screen 410 and/or screen 420, a validation user may be presented an approval input control, a request information input control, and/or a denial input control, as discussed above. In some aspects, the input controls may be different than the buttons illustrated in screens 410 or 420, or an indication of the determination by the validation user may be input via another mechanism, component, or device. For example, a validation user may provide as input the spoken words "approve," "request," and/or "deny" which may be received via a microphone and processed accordingly. The validation user may review one or more of the commands 413 and 414 and select the appropriate input. For example, the validation user may determine that the WRITE command 413 is approvable because it resulted in a desired deletion of a test file on a development database. The validation user may select the command 413 and input an indication of approval by the governance user (e.g., select approval input control 405). Alternatively, the governance user may determine that the WRITE command 413 is not approvable because it may result in a non-desirous deletion of a test file on a development database (for example, because the file is associated with a user different from the authorized user who entered the command). The validation user may indicate denial of the command (e.g. select denial input control 406), and an appropriate indication may be returned to the computing device and/or computing platform executing the commands. An indication of the denial may also be transmitted to a computing device associated with the authorized user that originally input the command (e.g., the device where the commands were entered, another device, or the like). For example, the authorized user that input the WRITE command may receive an e-mail indicating that the command has been denied.

The computing device/computing platform executing the commands may be different from the computing device and/or computing platform where pre-execution approval, or post-execution validation, occurred and different from the computing platform or computing device where the commands were input or entered. For example, the computing platform 310 may execute the commands entered at administrator computing device 340(1).

The computing platform 310 may determine that one or more commands entered at administrator computing device 340(1) require pre-execution approval. Where the command is presented for pre-execution approval, the computing platform 310 may communicate an indication of the command to the governance user computing device 360 for pre-execution approval and may pause, halt, wait, terminate, or delay execution of the command (or a sequence of commands). The computing platform 310 may receive an indication of approval of the command and may resume, restart, begin, commence, start, or execute the command (or sequence of commands). The command may be any type of command, such as an operating system command, application command, user interface command, database command, network command, and so on.

Additionally or alternatively, the computing platform 310 may determine that one or more commands entered at administrator computing device 340(1) require post-execution validation. Where the command is flagged for post-execution validation, the computing platform 310 may communicate an indication of the command to the validation user computing device 330 for post-execution validation and may flag, identify, associate, mark, the command or the result of execution of the command (or a sequence of commands). The computing platform 310 may receive an indication of approval of the command and may remove the flag or other marker. Alternatively, the computing platform may receive an indication of denial of the command and may undo, remove, roll back, or wipe the execution of the command or the result of the execution of the command (or sequence of commands). The command may be any type of command, such as an operating system command, application command, user interface command, database command, network command, and so on.

Criteria which may be used in determining whether one or more commands entered require pre-execution approval or post-execution validation include, for example, information about the entered command (e.g., "move," "delete," and so on), information about the variables entered with the entered command (e.g., "delete one row," "delete all rows," "add $X.XX to account Z," "add $YYYYYY.YY to account ZA," and so on), or information about the user requesting execution of the command (e.g., userID, role, account status, login time, last verified location, number of demerits, or the like). Other examples of criteria may be information about the computing device operated by the user requesting execution of the command such as Internet Protocol address, Media Access Control address, network connection status, running process information, geographical location of the device, device type (e.g., smartphone, server, tablet, laptop, desktop, and so on). Further examples of criteria may be information about the restricted resource, device platform, system, and/or environment the authorized user is attempting to access (e.g., a database, a server, a production device, a test repository, computing platform 310, and so on). Still further examples of criteria may be contextual information, such as time of day, a case number, issue number, tracking number or other data provided with the inputted command to indicate the command is genuine, authentic, or so on. The criteria information may be supplied by the authorized user as part of a command entry process or determined at and/or provided by the device at which the command was entered, or another device, system, platform, or the like (e.g., computing platform 310).

FIGS. 8A and 8B illustrate still further examples of various criteria which may be used in performing a determination that a pre-execution approval or post-execution validation is required. One illustrative criteria may be whether an authorized user has been pre-approved to execute the inputted command: if the user is pre-approved to execute the command, approval by another user prior to execution (e.g., by a governance user) or subsequent to execution (e.g., by a validation user) might not be required. FIG. 8 provides an illustrative computing system for purposes of discussion of such pre-approval.

In the illustrative computing system 800, in addition to the data collection 820 which may store information about the authorized users of the computing system two databases may be present: a development database (dev DB) and a production database (prod DB). Furthermore, authorized users may have access to only seven commands when interacting with the illustrative development database and illustrative production database: read a row ("read"), append a new row to the database ("write"), copy an existing row to a new row ("copy"), flag a row for review ("flag"), delete a row from the database ("delete"), modify an existing row ("modify"), and move a row from one database to the other database ("move"). Of course, this scenario is presented only for discussion purposes, and in other embodiments of the present disclosure, any number and type of commands may be used, as the users may interact with any number or type of computing devices and/or computing platforms. Assume that User1 (802) may be a developer within an organization, which may be indicated by an appropriate field within the data collection (e.g., the "role" field). User 802 may receive, as a result of their role as developer, authorization to access the production database and the development database.

In some aspects, an authorized user may receive pre-approval status with respect to one or more commands, resources, computing devices, computing platforms, computing systems, and/or computing environments. For example, User 802 may be pre-approved to enter the "read," "write," "copy," and "flag" commands on the development database, because the user's pre-approval code of "1" may indicate development database pre-approval only, and/or because the enumerated pre-approved commands may be indicated as "read, write, copy, flag." As another example, a user named User4 (804), who may be an database architect, may be pre-approved to read, write, flag, and modify on the production database and/or the development database. The pre-approval may be provided on a command basis (e.g., the fourth column of data collection 800) and/or on a device basis, resource basis, platform basis, system basis, and/or environment basis (e.g., the third column of data collection 800). In some aspects, pre-approval with respect to operating a device, resource, platform, and so on may provide rights to access additional devices, resources, platforms, and so on. For example, pre-approval may be provided to commands for operating a database, and based on the pre-approval to operate the database, pre-approval may also be provided to access a network resource (e.g., server, router, hub, or the like) to facilitate communication with the database. In some aspects, as depicted in FIG. 8A, information regarding pre-approval of a resource, system, platform, and so on may be stored as a single bit (e.g., a first bit in the third column of data collection 800 indicates whether the user is pre-approved for the development database, and a second bit in the same column indicates whether the user is pre-approved for the production database).

More complex forms of indicating pre-approval status than that depicted in FIG. 8A are possible and within the scope of the present disclosure. For example, a user may be pre-approved to execute a first set of commands for a first resource (e.g., a production database) and a second set of commands for a second resource (e.g., a development database). Another example may be that a user is pre-approved for a command where a variable to the command is within a predetermined range and/or above or below a certain threshold. For example, a user may be pre-approved to perform a "write" command when a variable (e.g., "payment amount") is below a certain threshold (e.g., "$XXX.XX USD").

In some aspects, a criteria for performing a determination as to whether approval of a command may be whether a user is forbidden from executing a command. A prohibition may prevent a user's execution of the command from ever being approved (e.g., pre-approved, approved prior to execution, and/or validated subsequent to execution). For example, returning to the illustrative data collection 800 depicted in FIG. 8A, User 802 may be forbidden from invoking the "delete" command. As with pre-approval, a prohibition may be provided on a command basis (e.g., the fifth column of data collection 800) and/or on a device basis, resource basis, platform basis, system basis, and/or environment basis.

In some aspects, an organization may employ one or more governance users and/or one or more validation users who have been trained to review commands. These governance users and/or validation users may receive commands as they are inputted and queued for execution, or executed and queued for validation. In some aspects, this might not be with regard to the authorized user who input the command (e.g., a common queue of inputted or executed commands may be worked by one or more governance users or one or more validation users in the order of execution).

As illustrated by FIG. 8B, governance users and/or validation users may be assigned individual authorized users or roles, or individual commands (or groups of commands). For example, User5 and User3 may be tasked with reviewing any User1 attempt to execute a "write" command on the production database resource. In some aspects, both User5 and User3 must approve the attempt for the execution to commence. As another example, User3 or User4 may be tasked with reviewing any attempt by User2 to invoke the modify command on the production database. In some aspects, only one of User3 and User4 need approve the command (e.g., the command is queued for approval in either a queue for User3 or a queue for User4, but might not be queued in both queues). In some aspects, multiple levels of review may be desired. For example, after one of User3 and User4 approve the command, the command may be sent to User6 for that user's further review. If the reviewing user at the first level denies the command (e.g., the user selected between User3 and User4 denies the command), the denial may be sent to User6 for review of the denial.

Note that, in some aspects, a reviewing user might not have permissions or authorization to execute or invoke the command. An example use case may be, for example, when a governance user or validation user is a non-technical user tasked with reviewing execution of commands for legal or regulatory compliance. For example, any attempt to modify a production database may need be reviewed by a governance user. The hierarchy and rules regarding pre-execution approval or post-execution validation may be predefined, ordered (e.g., first applied rules may trump later applied rules), user-specified, or determined by one or more computing devices of the present disclosure by analysis of various governance user trends or workflows, and so on. For example, computing platform 310 and/or governance user computing device 360 may be programmed to determine that a particular governance user is qualified to review execution of a command. This qualification may result from, for example, an indication that the governance user has received training in the command, has recently reviewed a previous execution of the command, or so on.

Figure 5A:
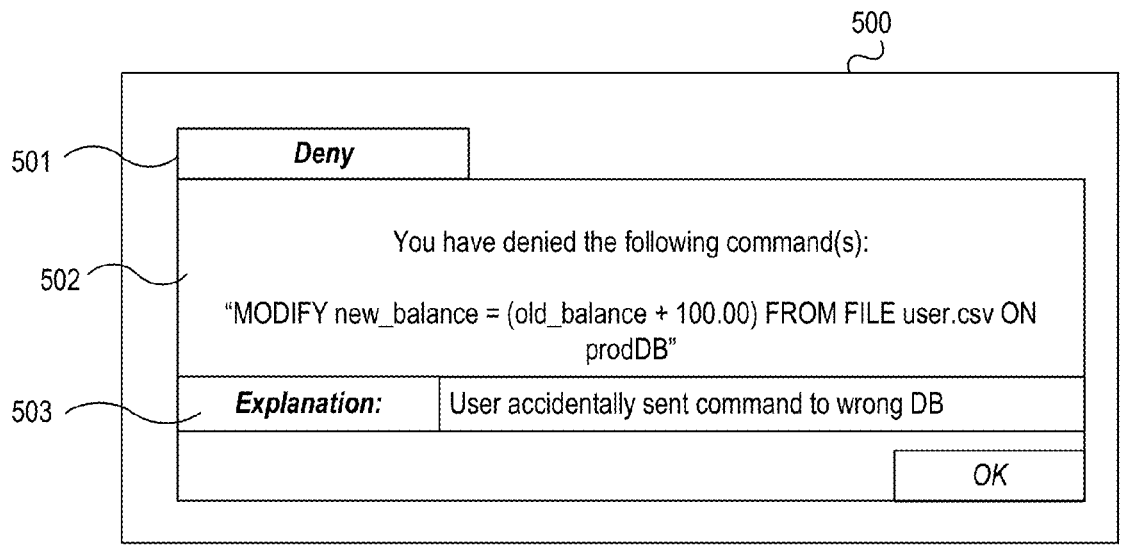
FIGS. 5A-D depict graphical user interfaces illustrating approval of a command, denial of a command, and requesting of more information from an authorized user, in accordance with one or more example embodiments.

FIGS. 5A-5D depict illustrative graphical user interfaces resulting from inputs of the governance user and/or the validation user on screens 410 and 420. FIG. 5A depicts a denial screen 500 which may result from a governance user or validation user inputting a denial of a command, either prior to execution of the command or subsequent to its execution. For example, screen 500 may be presented to a governance user if the governance user operates the denial input control 407. A confirmation of the denial 502 may be presented, as well as an input control 503 wherein the governance user and/or the validation user may provide an explanation as to why the command was denied. This may be recorded and stored at a data storage device for further analysis and review.

Figure 5B:
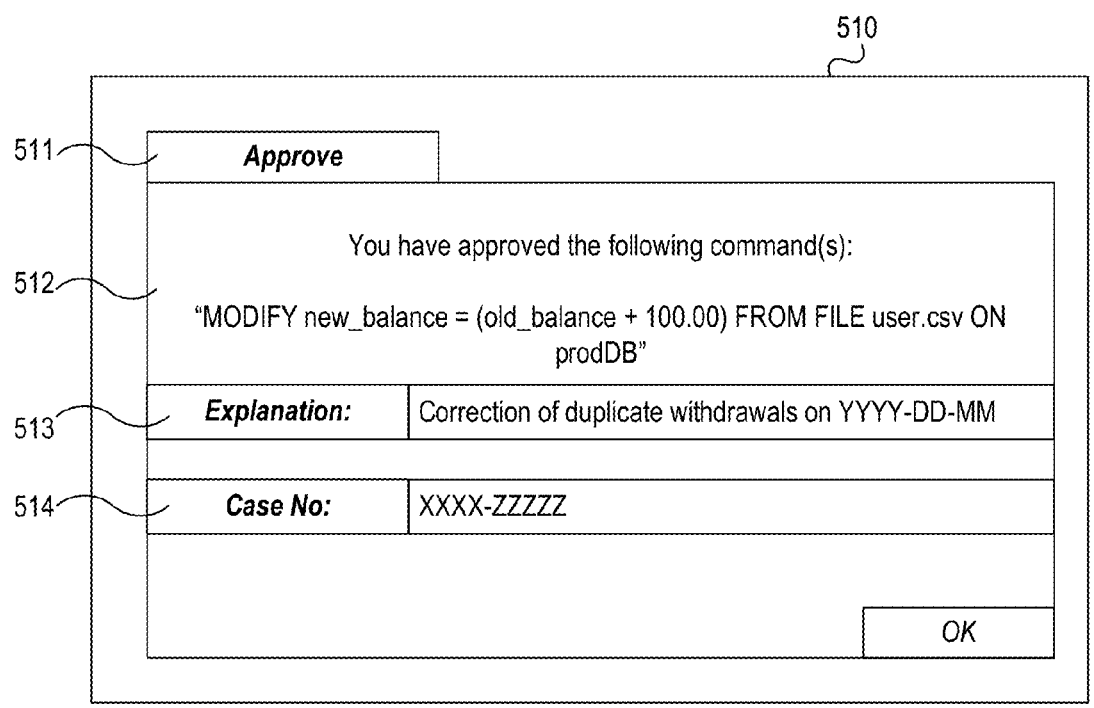

FIG. 5B depicts an approval screen 510 which may result from a governance user or validation user inputting an approval of a command, either prior to execution of the command or subsequent to its execution. For example, screen 510 may be presented to a validation user if the validation user operates the approval input control 405. A confirmation of the approval 512 may be presented, as well as an input control 513 wherein the governance user and/or the validation user may provide an explanation as to why the command was approved. This may be recorded and stored at a data storage device for further analysis and review.

Figure 5C:
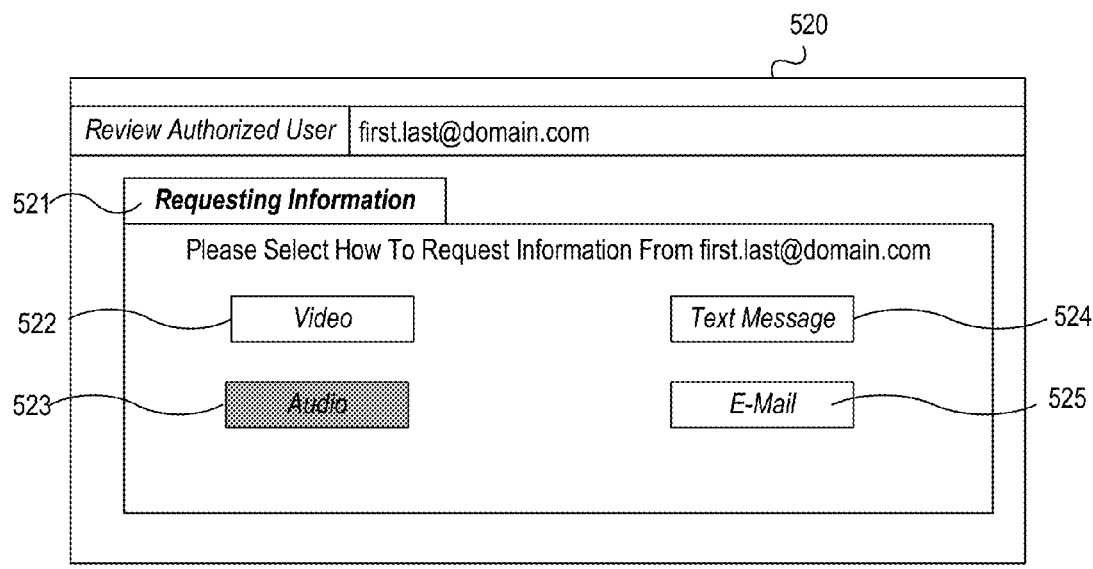
Figure 5D:
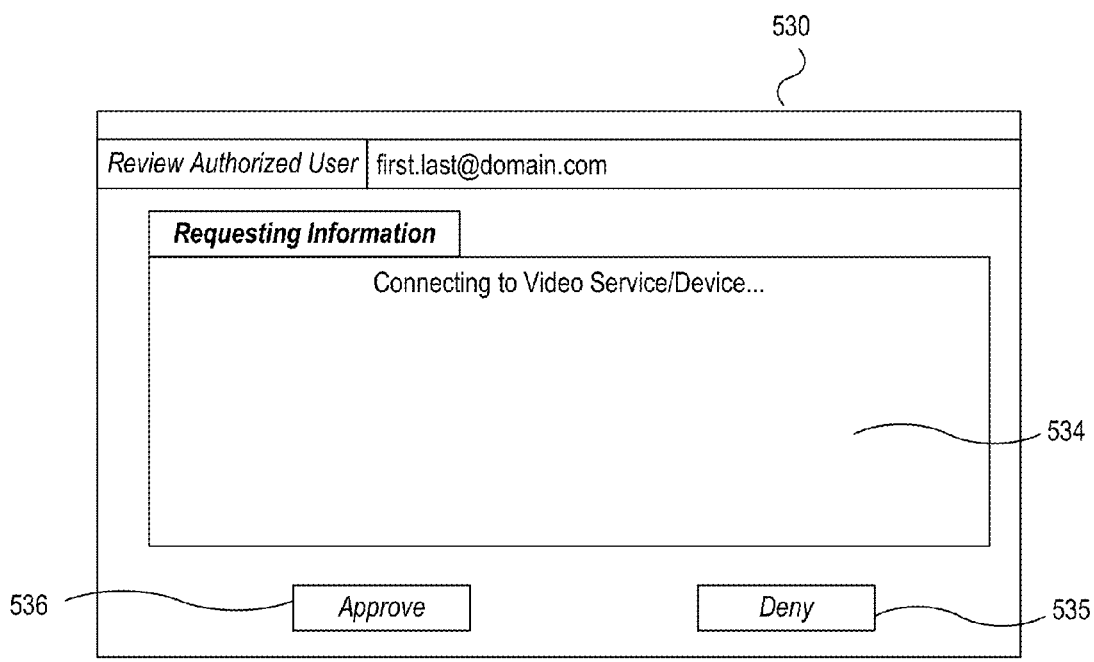

FIGS. 5C and 5D illustrate user interfaces for a governance user and/or a validation user to request more information from an authorized user prior to the denial or approval of commands under review. More information from the authorized user may be desirable in situations, such as (for example) where the command is complicated, affects a certain resource or device, or is difficult for the governance user or validation user to understand. Upon inputting that more information is requested from the authorized user who input the command (e.g., upon selection of information input control 406), a governance user or validation user may be provided with one or more selections to request additional information. The selections may be as illustrated in FIG. 5C, and may include (for example), video selection control 522, audio selection control 523, text message selection control 524, and e-mail selection control 525. The various options present or selectable by a governance user or validation user in screen 520 (e.g., via tab 521) may be determined by available software, firmware, hardware, and so on at one or more computing devices. For example, audio selection control 523 may be unselectable because it may be determined that a telephone of an authorized user is non-operational.

A governance user or validation user may select one or more of the selection controls 521-524, and therefore select its corresponding mechanism to contact the authorized user. In some aspects, a selection may be made from the available choices for the requesting user by a computing device or platform. In some aspects, the computer-selected information request mechanism may be selected based on the one or more criteria discussed above (e.g., a command may be associated with a high-severity issue, and resolution of the high-severity issue may be achieved more rapidly if the authorized user and the governance user communicate in real-time, such as via video or audio).

Once a selection has been made, as illustrated in FIG. 5D, a communication mechanism may be instantiated. For example, where a video communication is requested, a video service provider (either operated by the organization or a third party) may be contacted and video services may be requested. The video service provider may contact one or more devices associated with the authorized user (e.g., administrator computing device 340(1), a mobile device associated with the authorized user). If audio services are requested, a service providing audio communication between the users may be instantiated (e.g., telephone call via POTS, ISDN, VoIP, Internet call, and so on). Multiple selections may be made from screen 520 in situations, for example, where information is urgently needed by the reviewing user to approve or deny execution of the command. Once the information is received (via video, audio, and/or other communication service or system), the reviewing user (e.g., governance user or validation user) may approve or deny the command by selecting approval input control 536 or denial input control 535, which operate in a similar manner to the respective input controls discussed with respect to FIGS. 4A and 4B.

Figure 6C:
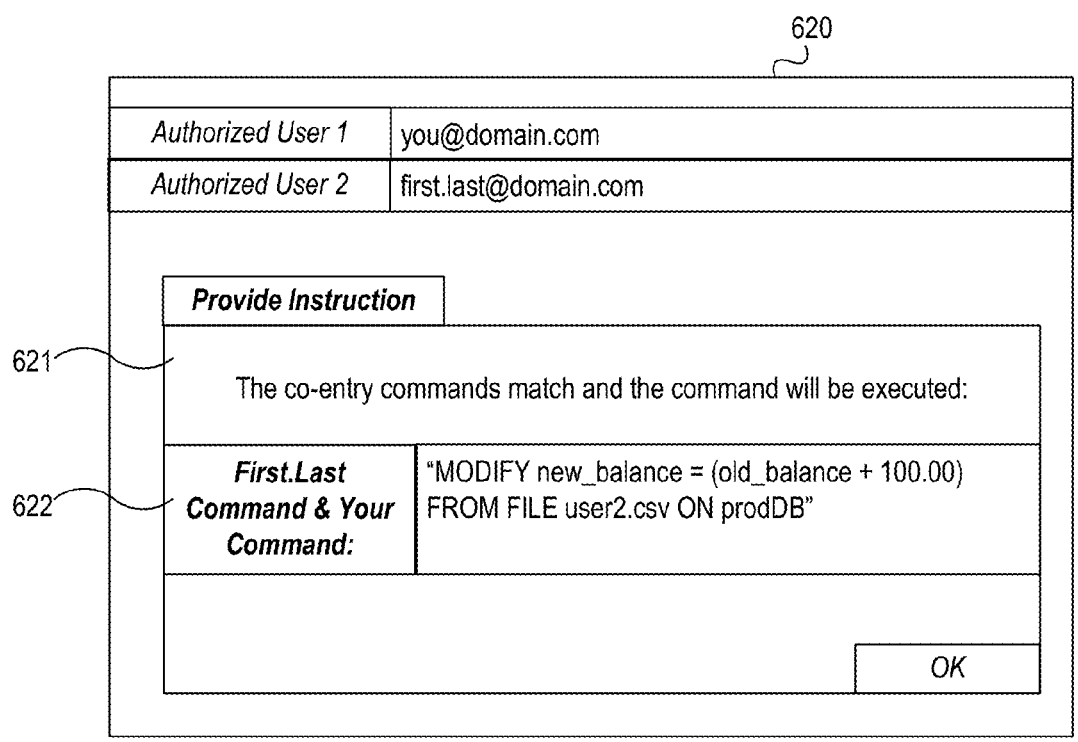

FIGS. 6A-6C illustrate example user interfaces in accordance with a split entry or co-entry command process, in accordance with one or more aspects of the present disclosure. In some aspects, in addition to or in the alternative from the pre-approval and/or post-execution validation, one or more commands may be co-entered by one or more authorized users. A first authorized user having a set of permissions including access to a restricted resource or device may be assigned a task, issue, case, or the like. The first authorized user may enter one or more commands to satisfy the task requirements, correct the issue, resolve the case, or so on. A second authorized user, who may have a different set of permissions may also be assigned the same task, issue, case, or the like. In some aspects, the first and second authorized user might not be aware of each other. For example, the first authorized user might not be aware of the identity, location, presence, or role of the second authorized user. Each of the first authorized user and the second authorized user might not be aware that both users have been assigned the same task, issue, case, or so on.

As illustrated in FIG. 6A, screen 600 may contain window 601 for providing instruction. An authorized user (e.g., the first authorized user or the second authorized user) may be provided with case information 602 and/or issue information 603. The case information 602 and/or issue information 603 may assist the authorized user in diagnosing the issue or case and in formulating commands for entry. Once formulated, the commands may be entered in command input control 604 for submission using submit input control 605.

In some aspects, screen 600 or components thereof may be displayed to two authorized users simultaneously. For example, the first authorized user may be operating administrator computing device 340(1) and the second authorized user may be operating administrator computing device 340(2). One or more computing devices and/or computing platforms may determine the availability of both users and/or both computing devices for diagnosis of the task, issue, and entry of one or more commands. Each computing device may receive at substantially the same time a signal indicating the task (e.g., case information 602 and/or issue information 603) and may cause to be displayed screen 600 and/or window 601. Simultaneous display of the command to both the first authorized user and the second authorized user may be desirable in an environment where tasks are discretized.

In some aspects, screen 600 might not be displayed simultaneously to both first authorized user and the second authorized user. A first user may receive the task, work the task (by diagnosing an issue or problem using informational components 602 and 603) and submit their resolution of the task. A computing device and/or computing platform (e.g., computing platform 310) may determine, based on the task, issue, command, authorized user, or other criteria, that co-entry of a resolution of the task is required. In response, the computing device and/or computing platform might not execute the entered commands (e.g., entered via command input control 604) but instead may transmit a signal to a second computing device and/or computing platform to display the same task, case, or issue information to a second authorized user.

The second authorized user may work the task (by diagnosing an issue or problem using informational components 602 and 603) and submit their resolution of the task. Once the second resolution of the task is received, a computing device and/or computing platform may compare the two received resolutions. This comparison may be a literal comparison, or may be based on one or more properties of the two resolutions (e.g., length of entered commands, variables entered, affected resources, and so on). Additionally or alternatively, the computing device and/or computing platform may generate a unified resolution based on the first resolution from the first authorized user and the second resolution from the second authorized user. The unified resolution may include commands from either or both of the resolutions.

If the two resolutions are not comparable, and/or a unified resolution cannot be generated based on the two resolutions, the result of the comparison may be presented to one or both authorized users (or to another user of the computing environment such as a supervisor, governance user, or validation user). For example, as illustrated in FIG. 6B, identification information about both authorized users may be presented in screen 610 along with their inputted resolutions (e.g., commands or sequences of commands). In this illustrative user interface, one of the two authorized users may be tasked with reviewing the two inputted resolutions 612 and 613 and determining if zero, one, or both correctly resolves the problem. The authorized user may select one of the resolutions by using the appropriate control of 614 and/or 615, or may request information from the other authorized user using input control 616, which may invoke a video, audio, instant message, or e-mail communication session with the other authorized user in a manner similar to that discussed above with respect to FIGS. 5C-D.

Alternatively, if the two resolutions are comparable, the result of the comparison may be presented to one or both authorized users (or to another user of the computing environment such as a supervisor, governance user, or validation user). For example, as illustrated in FIG. 6C, both the first authorized user and the second authorized user entered the same resolution (e.g., commands or sequences of commands). In the illustrative user interface of FIG. 6C (e.g., screen 620 comprising comparison information 621 and command information 622, one, both, and/or other users may be informed that the inputted commands will be queued for execution. Of course, in some aspects, a co-entered or split-entered command may be queued for pre-execution approval and/or post-execution validation.

FIG. 7 illustrates another mechanism for performing pre-execution approval, post-execution validation, and/or co- or split-entry of one or more commands using keycodes. The use of keycodes may serve as an additional or alternative mechanism to facilitate review of entered commands, as one or more users may be required to affirmatively input a value to indicate review of the entered command has been performed. Users of the computing environment may be provided with keycodes. A keycode may be a static passcode, password, or passphrase, but may also be dynamically generated. In some aspects, a keycode may be generated by a first computing device and/or computing platform (e.g., computing platform 310) and transmitted to a computing device associated with the authorized user (e.g., administrator computing device 340(1)). In some aspects, applications operating on multiple computing devices may be instantiated with the same base value, and keycodes may be generated based on application of an algorithm so that base value so that the multiple computing devices generate the same keycode in synchronous manner.

As illustrated in FIG. 7A, an authorizing user may be presented with a user interface comprising a screen 700 and a window 701 for entry of one or more commands. As illustrated, in some aspects, case or issue information similar to that discussed above with respect to FIG. 6A may be provided. The authorized user may enter one or more commands in the command entry input control 702. Additionally, the authorized user may enter a keycode in keycode entry input control 703.

As illustrated in FIG. 7B, a reviewing user (e.g., another authorized user, a governance user, a validation user, and so on) may be presented with a user interface including screen 710 and window 711. This user interface may be presented on any computing device of the computing environment. The reviewing user may review the entered command or sequence of commands 712 (e.g., one or more commands queued for pre-execution approval, one or more command awaiting post-execution validation) and may provide, via keycode input control 713 the keycode of the reviewing user. In some aspects, the user interface of FIG. 7B may include an command input control to facilitate co-entry of one or more commands in a manner similar to that discussed above with respect to FIGS. 6A-C.

Figure 9:
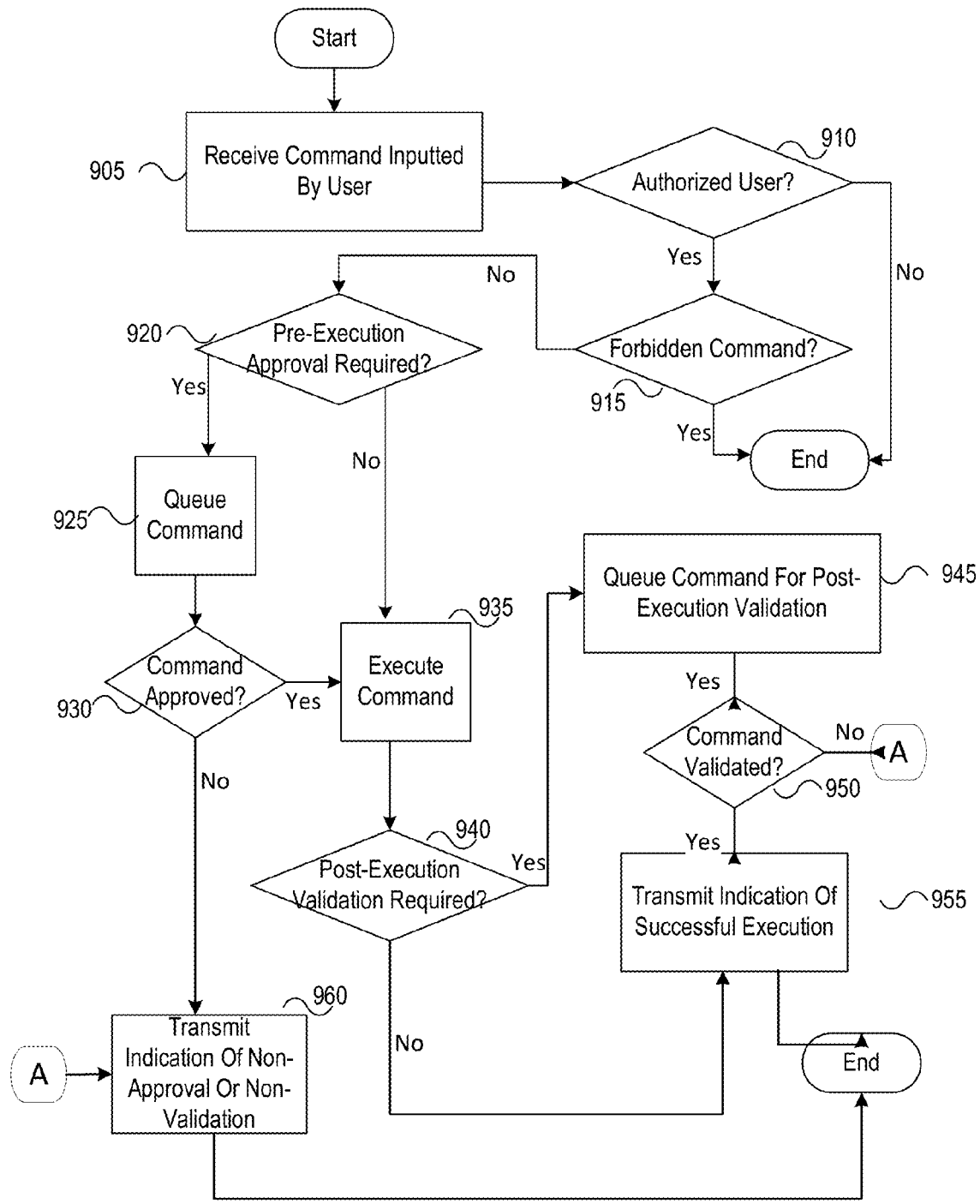
FIG. 9 depicts an illustrative method of performing pre-execution approval and/or post-execution validation according to one or more example embodiments.

FIG. 9 depicts an illustrative method of reviewing entered commands prior to execution of the commands and/or subsequent to execution of the commands, in accordance with one or more example embodiments. At step 905, a computing device (e.g., administrator computing device 340(1) or 340(2)) may display a user interface and/or may receive as input one or more commands to be executed on a computing device, computing system, or computing platform. In some aspects, these commands may include accessing of a restricted resource. At step 910, credentials regarding the user providing the input may be examined; if the user is not an authorized user to access the computing device, computing system, computing platform, or restricted resource (e.g., "No" branch) the process may end. If the user is an authorized user to access the computing device, computing system, computing platform, or restricted resource (e.g., "Yes" branch), the process may continue to step 915.

At step 915, the computing device and/or computing platform may determine whether one or more commands within the inputted commands is a forbidden command. As discussed above, in some aspects this determination may be on a per-user or per-resource/per-device (or so on) basis. If the inputted commands include a forbidden command (e.g., "Yes" branch) the process may end. If the inputted commands does not include a forbidden command (e.g., "No" branch) then the process may continue to step 920. In some aspects, for example where commands are forbidden for all users step 915 and 910 may be reversed in order. That is, the determination that inputted commands include a forbidden command may occur before a determination that the user is authorized to execute the inputted commands.

At step 920, the computing device and/or computing platform may determine whether one or more commands within the inputted commands require pre-execution approval. In some aspects, this may include the computing device and/or computing platform determining or examining one or more criteria (discussed above). If pre-execution approval is not required (e.g., "No" branch) the computing device and/or computing platform may transmit an indication that the inputted commands should be executed (e.g., the process may proceed to step 935). If pre-execution approval is required (e.g., "Yes" branch) then the command (or sequence of commands) may be queued for approval at step 925. This may include, for example, transmitting a notification to one or more computing devices (e.g., governance user computing device 360) that one or more commands await approval. Additionally or alternatively, this may include transmitting a notification to one or more computing devices, systems, platforms, and so on, that the commands have not been approved and execution of the commands should not be performed.

At step 930, the computing device and/or computing platform may receive an indication that the command (or sequence of commands) has or has not been approved. If so (e.g., "Yes" branch) an indication that the inputted commands should be executed may be transmitted to the executing device, system, resource, platform, and the like. The process may proceed to step 935 where the one or more commands may be executed.

If the computing device and/or computing platform receive an indication that the command or sequence of commands is not approved (e.g., "No" branch from step 930), then at step 960 the computing device and/or computing platform may transmit an indication of the non-approval of the command or sequence of commands. This may include, for example, logging the attempt to execute the command, transmitting a notification to a computing device associated with the authorized user that inputted the commands that the commands were not approved, and so on.

After execution of the commands at step 935, at step 940, the computing device and/or computing platform may determine whether one or more commands within the inputted commands require post-execution validation. In some aspects, this may include the computing device and/or computing platform determining or examining one or more criteria (discussed above). If post-execution validation is not required (e.g., "No" branch) the computing device and/or computing platform may transmit an indication that the inputted commands have been executed (e.g., the process may proceed to step 955). If post-execution validation is required (e.g., "Yes" branch) then the command (or sequence of commands) may be queued for validation at step 945. This may include, for example, transmitting a notification to one or more computing devices (e.g., validation user computing device 330) that one or more commands await validation or review. Additionally or alternatively, this may include transmitting a notification to one or more computing devices, systems, platforms, and so on, that the commands have not yet been validated and execution of the commands should be marked for possible reversal or roll back.

At step 950, the computing device and/or computing platform may receive an indication that the command (or sequence of commands) has or has not been validated. If so (e.g., "Yes" branch) an indication that the inputted commands were validated may be transmitted to the executing device, system, resource, platform, and the like. The process may proceed to step 955 where transmission of an indication of successful execution of the one or more inputted commands may occur.

If the computing device and/or computing platform receive an indication that the command or sequence of commands is not validated (e.g., "No" branch from step 950), then at step 960 the computing device and/or computing platform may transmit an indication of the non-validation of the command or sequence of commands. This may include, for example, logging the attempt to execute the command, transmitting a notification to a computing device associated with the authorized user that inputted the commands that the commands were not validated, and so on. This may also include, for example, rolling back the execution of the command so that the device, system, resource, or platform may be returned to a pre-execution state.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A method comprising:
dynamically generating, by a computing platform, a keycode used to facilitate review;
transmitting, by the computing platform and to a first computing device associated with an authorized user, the keycode;
receiving, by a second computing device and from a user associated with the second computing device, one or more inputted commands, wherein the user associated with the second computing device is authorized to execute one or more commands affecting a restricted resource;
determining, by the second computing device, that the inputted commands comprise a restricted command to access the restricted resource;
determining, based on the determination of the restricted command, that the user associated with the second computing device requires an approval from the authorized user to execute the restricted command;
queuing the restricted command in a queue in response to the determining that the restricted command requires the approval;
instantiating, by the first computing device and in response to the determination that the user associated with the first computing device requires the approval from the authorized user to execute the restricted command, a real-time communication session between the authorized user and the user associated with the second computing device;

receiving, by the second computing device and from the first computing device associated with the authorized user, an indication of an approval status of the restricted command;

receiving, by the second computing device and from the first computing device associated with the authorized user, the dynamically generated keycode as an additional indication of the approval status of the restricted command; and transmitting, by the first computing device, one or more notifications to another device to update a record stored at the another device and associated with the restricted resource to include information indicating the approval status.

2. The method of claim 1, wherein the approval status comprises an approval of the restricted command, the method further comprising:

removing the restricted command from the queue in response to receiving the approval status; and executing the restricted command.

3. The method of claim 1, wherein the approval status comprises a denial of the command, the method further comprising:

transmitting, by the second computing device, an indication of the denial.

4. The method of claim 1, wherein the real-time communication session comprises a telephonic communication session.

5. The method of claim 1 wherein the real-time communication session comprises a video communication session.

6. The method of claim 1, wherein the restricted resource comprises a database and wherein the restricted command comprises a command to modify the database.

7. The method of claim 1, further comprising:

determining that the inputted commands comprise a second command to access the restricted resource;
determining that the user associated with the second computing device has received a pre-approval to execute the second command; and
executing the second command.

8. The method of claim 1, wherein determining, based on the determination of the restricted command, that the user associated with the second computing device requires an approval from the authorized user to execute the restricted command comprises determining that the restricted command is not in a collection of forbidden commands, each forbidden command in the collection comprising a command that the user associated with the second computing device is not authorized to execute.

9. A method comprising:

dynamically generating, by a computing platform, a keycode used to facilitate review;
transmitting, by the computing platform and to a first computing device associated with an authorized user, the keycode;
receiving, by a second computing device and from a user associated with the second computing device, one or more inputted commands, wherein the one or more inputted commands comprises a restricted command to access a restricted resource, and wherein the user associated with the second computing device is authorized to execute commands affecting the restricted resource;

determining, by the second computing device, that execution of the restricted command by the user associated with the second computing device requires a validation from the authorized user;
queuing the one or more inputted commands for execution;
receiving an indication that the one or more inputted commands have been executed;
transmitting, by the second computing device, one or more notifications to the first computing device to update a record stored at the first computing device and associated with the restricted command to include information indicating the restricted command has been executed by the user;
instantiating, by the second computing device and based on the determination that execution of the restricted command requires the validation from the authorized user, a real-time communication session between the authorized user and the user associated with the second computing device;
receiving, by the second computing device and from the first computing device associated with the authorized user, an indication of a validation status of the command; and
receiving, by the second computing device and from the first computing device associated with the authorized user, the keycode as an additional indication of validation status of the command.

10. The method of claim 9, wherein the validation status comprises an approval of the restricted command, the method further comprising:

transmitting, by the second computing device, one or more notifications to another device to update a record stored at the another device and associated with the restricted command to include information indicating the restricted command has been executed validly by the user.

11. The method of claim 9, wherein the validation status comprises a denial of the command, the method further comprising:

transmitting, by the second computing device, one or more notifications to another device to update a record stored at the another device and associated with the restricted command to include information indicating the restricted command has not been executed validly by the user; and
queuing one or more generated commands for execution, wherein the one or more generated commands counteract the execution of the restricted command.

12. The method of claim 9, wherein the real-time communication session comprises a telephonic communication session.

13. The method of claim 9, wherein the real-time communication session comprises a video communication session.

14. The method of claim 9, wherein the restricted resource comprises a database and wherein the restricted command comprises a command to modify the database.

15. The method of claim 9, further comprising:

determining that the inputted commands comprises a second command to access the restricted resource;
determining that the user associated with the second computing device has received a pre-approval to execute the second command; and
transmitting, by the second computing device, one or more notifications to another device to update a record stored at the another device and associated with the second command to include information indicating the second command has been executed validly by the user.

16. A method comprising:

dynamically generating, by a computing platform, a keycode used to facilitate review;

transmitting, by the computing platform and to a first computing device associated with a governance user, the keycode;

receiving, by a second computing device and from an inputting user associated with the second computing device, one or more inputted commands, wherein the inputting user is authorized to execute one or more commands affecting a restricted resource;

determining, by the second computing device, that the inputted commands comprises a restricted command to access the restricted resource;

determining, based on the determination of the restricted command, that the inputting user requires an approval from a governance user to execute the restricted command;

queuing the restricted command in a queue in response to the determining that the restricted command requires the approval;

instantiating, by the second computing device and based on the determination that execution of the restricted command requires the approval from the governance user, a real-time communication session between the governance user and the inputting user;

receiving, by the second computing device and from the first computing device associated with the governance user, an indication of an approval of the restricted command;

receiving, by the second computing device and from the first computing device associated with the governance user, the dynamically generated keycode as an additional indication of the approval of the restricted command;

transmitting, by the second computing device, one or more notifications to another device to update a record stored at the another device and associated with the restricted resource to include information indicating the approval;

queuing the one or more inputted commands for execution;

receiving an indication that the one or more inputted commands have been executed;

determining that execution of the restricted command by the user associated with the second computing device requires a validation from a validation user;

instantiating, by the second computing device and based on the determination that execution of the restricted command requires the validation from the validation user, a real-time communication session between the validation user and at least one of the inputting user and the governance user;

receiving, by the second computing device and from a network location associated with the validation user, an indication of a validation status of the execution of the restricted command; and transmitting, by the second computing device, one or more notifications to the another device to update a record stored at the another device and associated with the restricted resource to include information indicating the validation status.

17. The method of claim 16, wherein the validation status comprises an approval of the restricted command, the method further comprising:

transmitting, by the second computing device, one or more notifications to the another device to update a record stored at the another device and associated with the restricted command to include information indicating the restricted command has been executed validly by the user.

18. The method of claim 16, wherein the validation status comprises a denial of the command, the method further comprising:

transmitting, by the second computing device, one or more notifications to the another device to update a record stored at the another device and associated with the restricted command to include information indicating the restricted command has not been executed validly by the user; and queuing one or more generated commands for execution, wherein the one or more generated commands counteract the execution of the restricted command.

19. The method of claim 16, wherein the real-time communication session between the governance user and the inputting user comprises a video communication session.

20. The method of claim 16, wherein the real-time communication session between the validation user and at least one of the governance user and the inputting user comprises a video communication session.

* * * * *